Feb. 7, 1961   HANS-JOACHIM LÖFFELBEIN   2,970,562
DIAL STRUCTURE
Filed Feb. 10, 1959   2 Sheets-Sheet 1
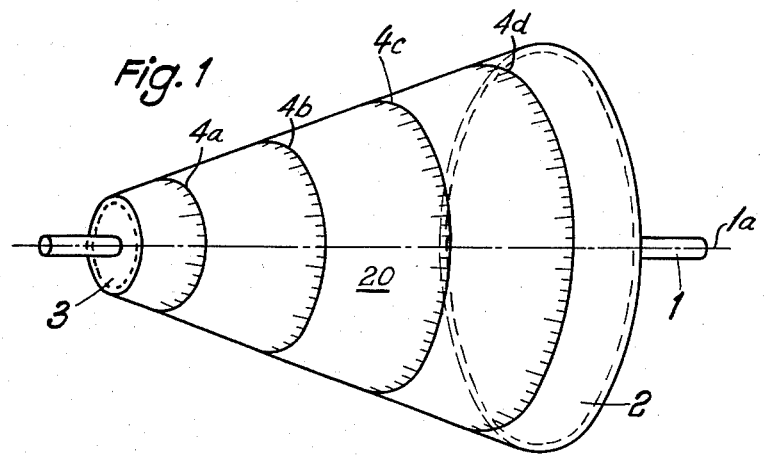
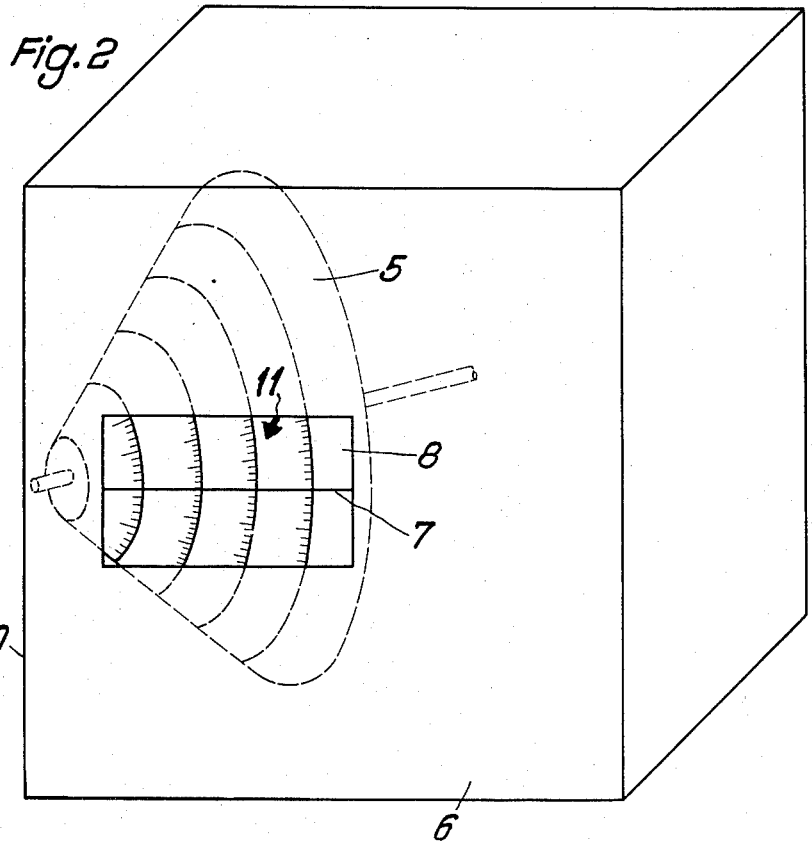
Inventor:
Hans-Joachim Löffelbein
By (signature)
Patent Agent

United States Patent Office 2,970,562
Patented Feb. 7, 1961

2,970,562

DIAL STRUCTURE

Hans-Joachim Löffelbein, Ulm (Danube), Germany, assignor to Telefunken G.m.b.H., Berlin, Germany Filed Feb. 10, 1959, Ser. No. 792,369

Claims priority, application Germany Feb. 18, 1958

4 Claims. (Cl. 116—124.1)

The present invention relates to an indicia carrying dial and the rotatable mounting of such a dial inside of a housing in register with one or more indicating markers, such as hairliners, which are attached to the housing.

It is a primary object of the present invention to provide a dial having a plurality of scales and/or scale ranges, this dial occuppying a space not larger than is necessary for the desired accuracy of indication.

It is another object of the present invention to provide an indicating device wherein a novel dial is shaped so as to enable an economical placement of such dial in a housing.

It is a further object of the invention to provide a new dial indicating the tuning frequency of a frequency selective instrument.

According to a preferred embodiment of the invention, scales are carried on a cone or a truncated cone. This cone-shaped carrier is suitably positioned near a corner of the housing.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modification within the spirit and scope of the invention will become apparent to those skilled in the art from this detailed description.

In the drawings:

Figure 1 shows a view of a dial in accordance with the invention;

Figure 2 shows a dial of the type shown in Figure 1, mounted inside a housing;

Figure 3:
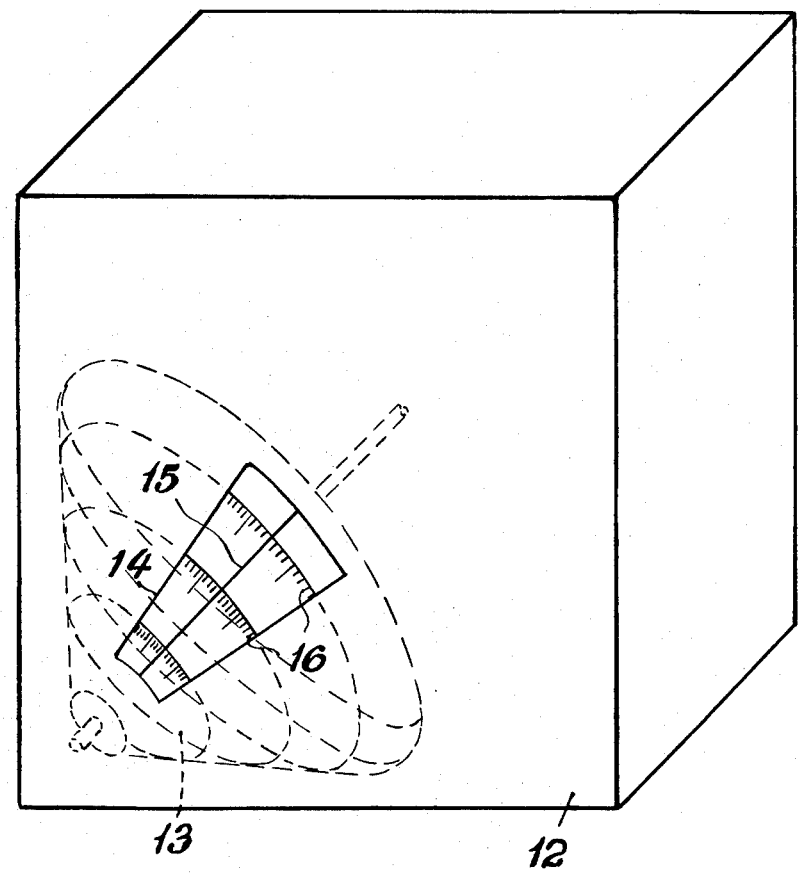
Figure 3 illustrates a similar dial in a different position inside a housing.

Referring in more detail to the drawings and, more particularly, Figure 1 thereof, a dial in the form of a truncated indicia carrier or cone 2 is secured to a shaft 1. The cone 2 is made of a suitable material, such as of plastic, and carries on its surface 20 several indicia scales 4a, 4b, 4c, 4d. The carrier or cone 2 is hollow, and is rotated by the shaft 1, the axis of the cone being shown at 1a. 3 is an end disk employed for securing the truncated cone 2 to the shaft 1 at the smaller end of the cone. The thickness of the wall of the hollow cone 2 is only a fraction of an inch, for example, in the range of $\frac{1}{10}$ inch. The base of the cone 2 is open. When the dial is mounted inside of a casing, the hollow space in the cone 2 is usable for housing circuit elements of the instrument of which the dial is a part, but no element must touch the dial or the shaft.

The surface of the cone 2 carries scales 4a, 4b, 4c, 4d, as already stated, which scales may represent various ranges of indicatiton. The device according to the invention is usable with great advantage in apparatus having various indicating ranges of different coverage. This is, for example, the case when the tuning frequency of an oscillator circuit is to be calibrated over a large range of frequencies. If, for example, the resonant frequency of an oscillator circuit is varied by means of a rotating capacitor and if, furthermore, the ranges of frequencies are varied in steps by changing the inductances of this circuit, then the width of the band is different for the different ranges. For low frequencies, a certain range scanned by a tuning capacitor will have widths smaller than ranges for higher frequencies. However, it is desirable to have about the same resolving power for high frequencies as well as for low frequencies, i.e., approximately equal frequency intervals within a linear length of scale. This requirement can be easily obtained with a scale carrier according to the invention. The scale 4a indicating the longest waves will be positioned on the carrier at its smallest radius and the scale 4d for the shortest waves will be positioned close to the base of the cone. The other scales are positioned in between on the surface of the conical carrier.

It is to be understood that the carrier according to the invention is not limited to devices for the indication of frequencies, but is equally well usable in devices for the indication of other kind of values.

The advantage of the arrangement according to the invention lies in conservation of space. Figure 2 shows how the novel conical dial is mounted near an edge of an instrument housing. The dial is mounted in such a manner that a marker line 7 in a window 8 in the front face 6 of the housing lies opposite and spaced from a tangential line of the cone 5 along its surface. The conical angle of the dial is about 90°. Thus, the shaft of the cone 5 bisects the angle between the front face 6 and the left-hand side face (not shown) of the housing, intersecting the front plate 6 at the edge 10. A hand or pointer 11 can be provided at the window 8, movable along the marker line 7, in order to indicate which particular scale is to be read. This hand 11 can be displaced by means of a range switch in accordance with the respectively selected range. As already mentioned, circuit elements may be located inside of the hollow carrier 5.

In some cases, it is advantageous to position the scale carrier in a corner of the instrument, as is shown in Figure 3. A housing 12 contains a dial cone 13. A window 14, in the approximate shape of a sector, is provided in the front face of the housing 12 for reading the desired scale. This window has a marker line 15 adjacent the cone 13 which approaches the front plate of the housing 12. In this position, the cone occupies the least possible space. Figure 3 also shows that the scales 16 on such a cone are not limited to a circular shape, i.e., the scale 16 on the cone 13 is arranged in the form of a spiral.

I claim:

1. A dial for indicating the frequency to which a frequency-selective member is tuned, which member is tunable over at least two frequency bands, said dial comprising a substantially conical carrier having an axis and at least two spaced frusto-conical zones corresponding, respectively, with said bands over which said member is tunable, each zone having an indicia scale in the form of a circle which is concentric with said axis with each scale having approximately the same frequency interval per unit length of scale.

2. In a dial as set forth in claim 1, said carrier being supported on a rotary shaft aligned with the axis of the carrier and said carrier being hollow.

3. In a dial as set forth in claim 1, the indicia scale which corresponds with the lower-frequency band being located nearer the apex of the carrier.

4. In a dial as set forth in claim 1, wherein the cone angle of said carrier is approximately 90°; said dial further having a housing having at least two perpendicular walls meeting at an edge, and said carrier being disposed with its apex substantially intersecting said edge, the housing having a window through a wall adjacent said zone.

References Cited in the file of this patent

UNITED STATES PATENTS

| | | |
|---|---|---|
| 1,646,819 | Hutchinson | Oct. 25, 1927 |
| 1,675,974 | Gambarotta | July 3, 1928 |
| 2,373,168 | Cockerell | Apr. 10, 1945 |
| 2,678,621 | Proctor | May 18, 1954 |